United States Patent [19]
Nielsen

[11] Patent Number: 5,357,794
[45] Date of Patent: Oct. 25, 1994

[54] FARADAY EFFECT SMALL BOAT SPEED TRANSDUCER AND WATERPROOF CONNECTION FOR SAME

[75] Inventor: Paul Nielsen, Wilmington, Del.

[73] Assignee: Nielsen-Kellerman Co., Marcus Hook, Pa.

[21] Appl. No.: 897,405

[22] Filed: Jun. 12, 1992

[51] Int. Cl.$^5$ ............... G01C 21/00; G01F 1/58
[52] U.S. Cl. ................... 73/181; 73/861.12
[58] Field of Search .......... 73/181, 861.12, 861.16, 73/861.17

[56] References Cited

U.S. PATENT DOCUMENTS

| | | | |
|---|---|---|---|
| Re. 28,989 | 10/1976 | Cushing | 73/181 |
| 2,969,673 | 1/1961 | Snyder et al. | 73/181 |
| 3,003,354 | 10/1961 | Wood | 73/181 |
| 3,110,876 | 11/1963 | Ramey et al. | 73/181 |
| 3,596,513 | 8/1971 | Sandstedt | 73/181 |
| 3,677,082 | 7/1972 | Springston, Jr. et al. | 73/181 |
| 3,855,858 | 12/1974 | Cushing | 73/181 |
| 3,885,433 | 5/1975 | Marsh | 73/194 EM |
| 3,903,741 | 9/1975 | Greene | 73/181 |
| 3,940,983 | 3/1976 | Greene | 73/181 |
| 4,653,319 | 3/1987 | Parsonage | 73/181 |

OTHER PUBLICATIONS

Brochure–C. Plath "Navigation Automation Technical Data".
Brochure–NKE Electronics Topline Marine Electronics.
Kanwisher, J., et al. "Electgromagnetic Flow Sensors," Limnology and Oceanography, V. 20, pp. 174–182 (Mar. 1975).
Brochure–The Marsh–McBirney Model 201/201D.
Borchure–C. Plath Naviation Automation Technical Data.
Brochure–NKE Electronics Topline Marine Electronics.

Primary Examiner—Richard E. Chilcot, Jr.
Assistant Examiner—William L. Oen
Attorney, Agent, or Firm—Woodcock Washburn Kurtz Mackiewicz & Norris

[57] ABSTRACT

An improved speed transducer is disclosed. The present invention provides an alternating current coil speed transducer which utilizes the Faraday Effect to generate a voltage. The present invention discloses an improved amplifying circuit that amplifies the low voltages generated by small boats such as rowing shells to permit them to register accurate speed data at low speeds, e.g. between about 0.5 and 10 m/sec although higher speeds can be measured. The present invention also provides an improved technique for connecting a speed transducer to a boat that permits the speed transducer to be mounted and dismounted and the electrical connection broken without requiring extensive reworking of the speed transducer. In this regard, the present invention generally provides an improved technique for mounting and dismounting protruding apparatus that have electrical or other connections that extend into an object. A boom for mounting the speed transducer of the present invention or other types of transducers to a watercraft at a position outside the hydrodynamic boundary layer are also disclosed.

11 Claims, 5 Drawing Sheets

FARADAY EFFECT SMALL BOAT SPEED TRANSDUCER AND WATERPROOF CONNECTION FOR SAME

The present invention relates to speed transducers and, more particularly, to apparatus for determining the speed of a vessel using an electromagnetic sensor. The present invention also relates to connections between a sensor or transducer and a vessel.

BACKGROUND OF THE INVENTION

Numerous types of devices can be used to determine the speed of a vessel as it travels through a body of water. Certain devices, based upon ultrasonic principles, determine the speed of a vessel relative to the bottom of the body of water. Other types of sensors measure the relative speed through the water using, for example, a small paddle wheel or propeller. Another type of device that can determine relative speed through water is an electromagnetic flow sensor based upon the Faraday effect. The operating principle of the present invention is that of the Faraday Effect, in which a conductor moving perpendicularly to a magnetic field has induced within it an electric field that is perpendicular to both the velocity and the magnetic field directions. See *The Theory of Electromagnetic Flow Measurement*, J. A. Shercliff, Cambridge University Press (1962). In the case of a speed transducer, the conductor is water, with enough dissolved ions to make it sufficiently conductive.

Water speed transducers that utilize the Faraday effect are disclosed by U.S. Pat. Nos. 3,903,741 and 3,940,983 both issued to Greene. The devices disclosed by these patents are electromechanical and rely upon the rotation of a permanent magnet within a housing to produce a magnetic field. A Faraday effect transducer that uses a fixed permanent magnet is disclosed by U.S. Pat. No. 4,653,319 —Parsonage. Finally, U.S. Pat. No. 3,885,433—Marsh discloses a Faraday effect transducer that uses pairs of arcuate segment electrodes to produce a velocity signal. However, none of the transducers known in the prior art operate effectively at low speeds, and in addition many are cumbersome and not well suited for lightweight watercraft.

Several types of watercraft pose unique problems for speed determination. The shells and sculls used in competitive rowing are highly specialized, and the athletes who propel them are often closely matched in terms of physical ability. It therefore becomes crucial to minimize both the drag and weight of the shell. However, accurate speed information can be extremely useful both during training and during a race. Similarly, small sail craft require lightweight, low drag hulls and are of highly refined design within several classes. Thus, in either instance, it would be desirable to measure speed accurately without interfering with the operation of the vessel and without incurring excessive drag or adding excessive weight. Accordingly, it is an object of the present invention to provide a lightweight, streamlined electromagnetic transducer for use in determining the speed of watercraft. The relatively low speeds at which rowing shells and small sailboats travel, combined with the size restrictions discussed above, pose a problem wherein the electromagnetic flow sensors found in the prior art produce signals of insufficient power to be discriminated from environmental noise and other effects found in these applications. It is thus another object of the present invention to provide an amplifier circuit that provides sufficient amplification while eliminating the effects of background noise and the like.

Additionally, speed transducers as well as other types of transducers are mounted to a hull below the water line so they project beyond the surface of the hull. These transducers are typically housed or covered by a structure such as a fin that exhibits a low hydrodynamic drag coefficient. However, such projecting fins are easily damaged by obstructions in the water, e.g., logs, rocks, pilings, or by contact with objects when the watercraft is out of the water. In some instances, the fin is fastened using breakaway bolts designed to permit the fin to "snap off" rather than damaging the fin or the hull. These designs, however, do not provide an adequate solution for several reasons. First, the broken off fin is easily lost or further damaged when detached from the hull. Second, the through-hull electrical connection is broken and is typically not easily repairable. This latter problem results from the electrical connection being "potted" within the fin to protect it from water damage. As well known to those of ordinary skill, a potted connection comprises a connector that is encapsulated to protect it from the environment. For example, an electrical connector might be covered with epoxy in order to create a watertight connection. Potted connections, however, are not easily repaired or disconnected. Thus, when a transducer has been broken free from the hull, it cannot be reconnected without returning the fin to a repair facility to remove and repot the connector. The potted connection also prevents transducers from being exchanged between boats. It would therefore be desirable to provide an electrical connection to a hull-mounted transducer or other device that is watertight and can be easily reconnected should the transducer be broken off or otherwise removed from the hull. Accordingly, it is an object of the present invention to provide such improved transducer connections.

SUMMARY OF THE INVENTION

The present invention provides a Faraday Effect speed transducer with numerous advantages over previous designs. The speed transducer is in the form of a hydrodynamically shaped fin, to minimize flow resistance, and is mounted to the bottom of a rowing shell, sailboat, or other watercraft. The transducer of the present invention is preferably mounted using breakaway fasteners. However, the electrical connection is made using a standard connector disposed in a cavity filled with waterproof grease or jelly.

Accordingly, the present invention provides a watercraft speed transducer comprising a housing that includes two input electrodes extending from within the housing and through the housing. A coil for producing an alternating current magnetic field that is comprised of a laminated iron core wound with copper wire, and provided with a Faraday shield, is disposed within the housing and mechanically connected to these two input electrodes. A grounding electrode is electrically connected to the circuit ground. A differential amplifier amplifies an input voltage signal and is connected to the coil. The amplifier provides an output signal to a connector for transmitting the output signal to a means for signal processing. The coil produces an input voltage generated by the Faraday Effect due to the motion of the transducer through the water if the water through which the transducer is traveling has a sufficient quantity of dissolved ions.

In a preferred embodiment, the coil, connector and differential amplifier of the speed transducer are disposed on a single circuit board. Most preferably, the circuit board is molded within the housing and the housing further comprises a cavity in which the connector is disposed. The present invention also discloses novel methods and apparatus for waterproofing such a connection. Thus, in the case of the water speed transducer disclosed herein, a waterproof material is used to fill the cavity and the waterproof material most preferably comprises a waterproof grease.

In certain preferred embodiments of the present invention, a restraining cable is provided that is connected to both the watercraft and to the speed transducer and the transducer itself is mounted to the watercraft using bolts or, most preferably, a spline formed on the top edge of the fin and inserted into a cooperating slot in the watercraft. In another embodiment, a mounting block held in place by the bolts is placed inside the watercraft such that the hull of the watercraft is disposed between the mounting block and the transducer. This mounting block provides a watertight cable access fitting that permits the cable to extend into an area that permits an electrical connection to be made with the speed transducer. Most preferably, the connector disposed within the cavity is connected to a cable that extends into the cavity within the mounting block where it is joined by a transition connector to a second cable that extends through the watertight cable access fitting. A third embodiment for mounting discloses an outrigger boom designed to mount any type of speed transducer outside the hydrodynamic boundary layer of the hull.

The speed transducer of the present invention most preferably uses an alternating current coil since the present invention is directed to measuring the speed of watercraft which travel at low speeds, e.g., less than 7.0 m/sec, and which changes frequently and periodically, however, higher speeds can be accurately measured as well. The present invention also provides an improved differential amplifier which comprises both a circuit for increasing the impedance of the amplifier and a circuit for filtering RF interference to permit a useful speed indication signal to be generated from the input voltage produced by moving the alternating current coil through the water at low speeds.

In addition to the water speed indicator disclosed herein, the present invention also generally provides improved methods and apparatus for connecting any protruding device that is detachably affixed to an object and which has at least one connector disposed within the protruding device for providing a connection with the object through a connector lead. By disposing the connector and the connector lead within a cavity formed within the protruding object and filling the cavity with an extrudable, viscous substance, a watertight or otherwise protected connection is made which can be easily broken, i.e., disconnected and reconnected in a much simpler manner than the potted connections typically provided in the prior art.

DETAILED DESCRIPTION OF THE PREFERRED EMBODIMENTS

Figure 1:
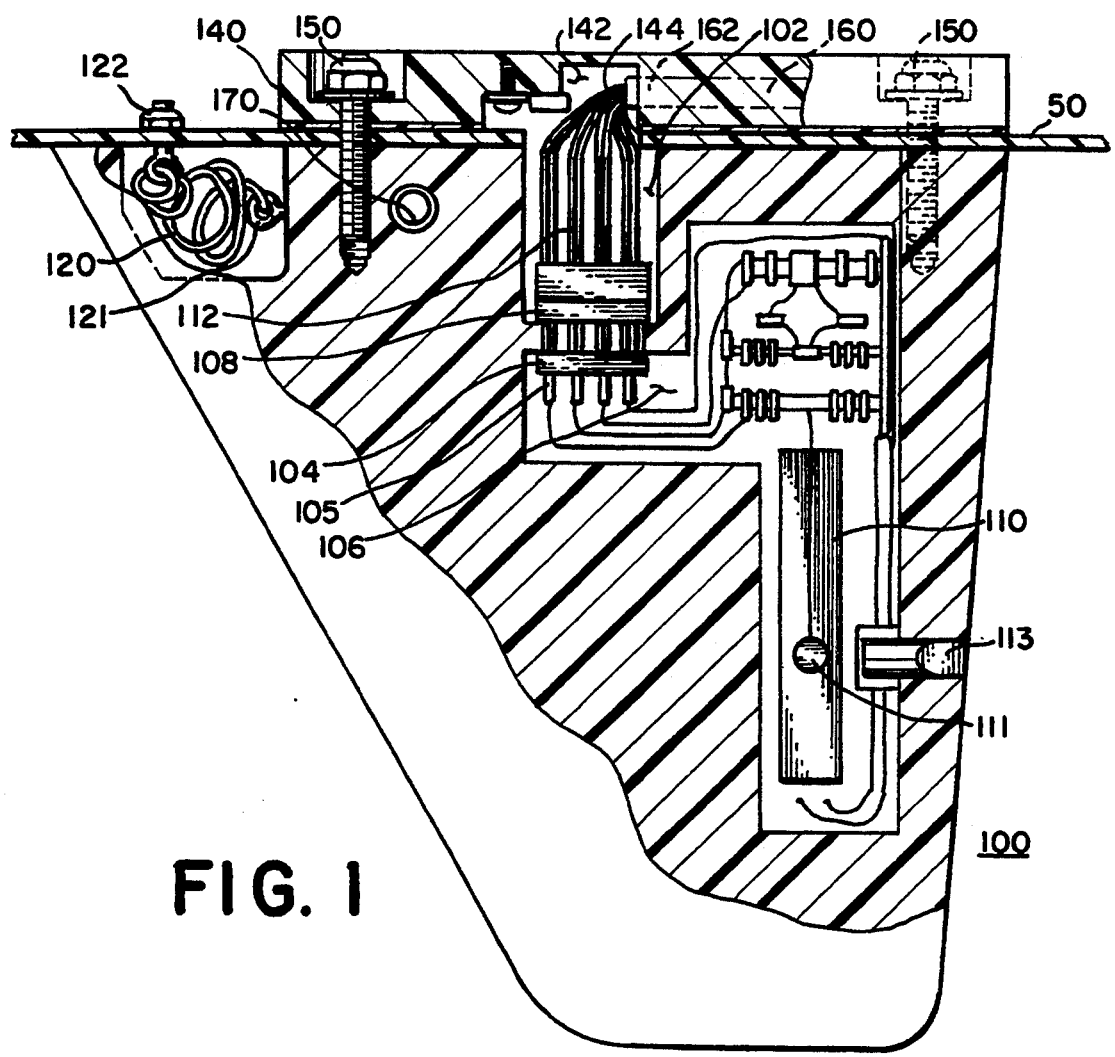
FIG. 1 is a partially broken away side elevation view of the speed transducer of the present invention, shown mounted to a hull.

FIG. 1 illustrates a transducer 100 mounted to a hull 50 for producing an alternating current (AC) magnetic field using a coil 110 having a laminated iron core, that is preferably mounted vertically in the transducer 100, so that water moving horizontally past the transducer 100 will have induced an electric field which is perpendicular to the transducer surface. The coil 110 generates an AC magnetic field in the water surrounding the transducer 100. The perpendicular AC electric field is picked up on the coil-mounted electrodes 111 that are symmetrically disposed on either side of the coil as shown in FIG. 1. A grounding electrode 113 provides an electrical grounding point which is symmetrically disposed with respect to the coil-mounted electrodes 111. The grounding electrode 113 is preferably placed in the downstream edge of the transducer 100 to minimize mechanical damage in the event that the transducer 100 strikes a log or other debris in the water. The electrodes 111,113 are preferably made of carbon, nickel filled epoxy, or other electrically conductive materials which do not react with fresh or salt water.

The preferred embodiments of the present invention utilize a transducer 100 with a molded or otherwise produced internal cavity 102 into which project the connector pins 105 of a standard electronic connector 104, that are soldered to a printed circuit board 106 on which amplifying electronics and coil 110 are mounted. An insulation displacement connector socket (IDC) 108, is pressed onto a length of connecting flat cable, i.e., ribbon cable 112, and can be then slid into the cavity 102 and over the printed circuit board-mounted connector pins 105. Thus, FIG. 1 depicts the situation wherein the connector 108 has been slid over the pins 105, but has not yet been pressed fully into the bottom of the cavity 102. As explained in detail below, in order to provide a waterfree connection, which is essential to prevent corrosion of the wires and connector pins 105 and to prevent excessive electrical conductivity between the various connections, the cavity 102 is partially filled with a material such as a waterproof grease or petroleum jelly before the connector 104 and pins 105 are mated with the cable-mounted socket 108, and then filled to the top. The use of grease or petroleum jelly provides a water-free connection which can be inspected and broken when necessary for changing cables, detaching the transducer 100 for hull repairs, and reattaching the transducer 100 after it has been separated from the hull 50 by contact with a log or other foreign body in the water. As noted above, in prior art designs cables have been permanently potted into transducers, as for example in those manufactured by Marsh-McBirney and NKE, with no possibility of repair after damage.

The above-described preferred embodiment illustrates one of the general aspects of the present invention. Although described with specific reference to a Faraday effect speed transducer, the waterproof detachable connection described with reference to FIG. 1 could be incorporated into any type of transducer that requires a through hull connection. Thus, this aspect of the present invention provides a system for mounting a fin to a hull 50 whereby a connection between the IDC socket 108 and pins 105 is made waterproof by providing a cavity 102 extending between the pins 105 and the edge of the fin 100 in which the pins 105 are disposed. After the IDC socket 108 is engaged, the space within the cavity 102 not occupied by the IDC connector 108 and its cable 112 is filled with a waterproof grease or jelly. The grease or jelly should be chosen so that it is stable in the environment in which the fin is used. Additionally, the grease or jelly should be readily dissolved by a solvent that is not harmful to the materials of the fin and connector.

Those of ordinary skill will therefore understand that the detachable waterproof connection disclosed by the present invention can be readily adapted for use with any type of structure that contains a connection. The connector itself is not limited to the IDC connector 108 shown and may be any of a number of varieties, including sliding fit, snap fit, bayonet connectors, card edge pins, etc. Moreover, the waterproof nature of the connection disclosed by the present invention is suitable for attaching transducers, sensors, probes and the like to things other than watercraft such as waterborne structures, as well as non-marine applications such as aircraft and other vehicles or structures from which such devices protrude.

Figure 4:
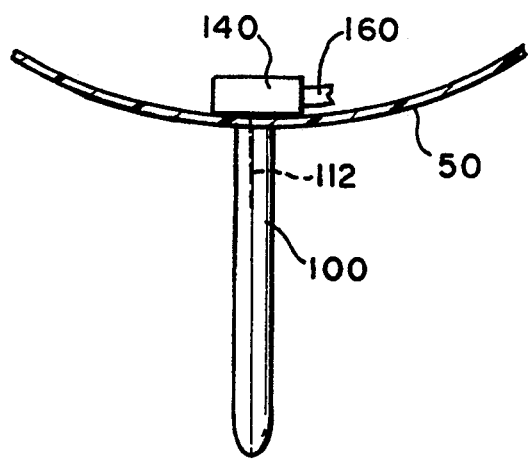
FIG. 4 is a front elevation view of the speed transducer of the present invention shown mounted to a hull.

Additionally, by the incorporation of a restraining cable 120, shown in FIG. 1, if the transducer assembly 100 is broken free of the hull 50 by contact with a log or other foreign object, it will not be lost. As shown in FIG. 4, the restraining cable 120 is retained within the transducer assembly 100 in an area outside the location of the above described electronics package. The cable 120 or other restraining device is most preferably attached to the hull 50 by an eyebolt 122 or other suitable hardware. A similar eyebolt 121 is attached to the transducer assembly 100 as shown. The restraining cable 120 may also be attached to another appropriate location other than the hull 50. If the transducer 100 becomes detached it will be restrained from being lost due to the attachment between the cable 120 and the hull 50 via the eyebolt 122. As illustrated, the cable 120 is most preferably coiled within a pocket or recess formed in the transducer 100.

The embodiment of the present invention illustrated in FIG. 1 also provides a waterproof cable termination on the inside of the hull, thereby making it possible to assemble the transducer 100 to the hull 50 with only two small holes for the mounting studs 150, and a third small hole for the length of cable 160 which goes to the transducer 100. These holes are preferably less than 0.188 inches (4.8 mm) in diameter, and are preferably drilled through the middle of the typically 0.750 inch (19.0 mm) wide rib which runs along the inside hull of a wooden rowing shell without excessively weakening it. The above-described IDC socket 108 is pressed by the user onto the length of ribbon cable 112 which has been passed through the hull 50. In this way, the size of the hole is minimized, while easy termination is provided. It is obviously also desirable to minimize the size of holes which must be drilled in other types of hulls, such as those of sailing vessels and the fuselages or bodies of other equipment with which the present invention is used.

As illustrated in FIG. 1, the ribbon cable 112 is joined to a transition connector 144 that connects the ribbon cable 112 to a round cable 160. This connection is disposed within a cavity 142 formed within the mounting block 140 that is placed on the inside surface of the hull 50. The round cable 160 passes out of the mounting block 140 through a watertight hole or fitting 162 that provides a seal around the round cable 160. The transition connector 144 between the ribbon cable 112 and round cable 160 is waterproofed by filling the cavity 142 in the mounting block 140 with waterproof grease or jelly in a manner similar to that described above with reference to the cavity 102 in the transducer 100.

Figure 4A:
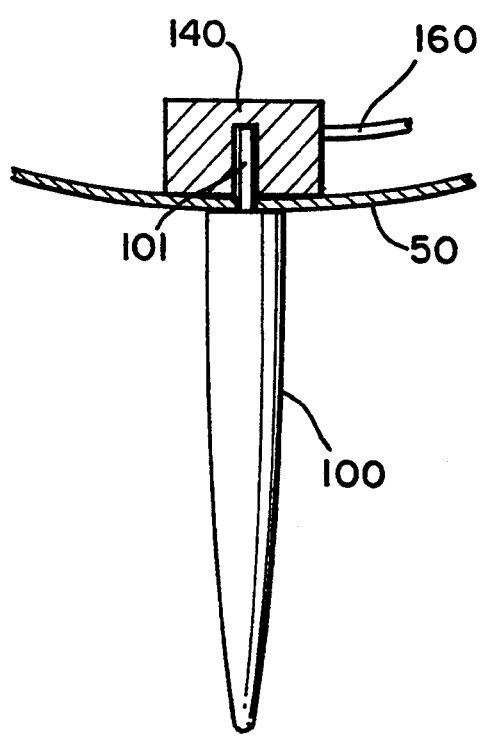
FIG. 4A is a sectional front elevation view, similar to FIG. 4, disclosing an alternate fin/hull mounting.

As shown in FIG. 4A, many single shells have a slot cut in the hull 50 and keel 140 into which a thin spline 101 extending from the transducer 100 is glued with room temperature vulcanizing (RTV) silicone adhesive or similar compounds. This area of the shell is not accessible from the inside. Alternatively, one or a pair of splines (disposed about the cavity for the ribbon cable) are inserted into a longitudinal slot in the top of the transducer 100, and the slot through the hull 50 through which the ribbon cable 112 will be fed. After attaching the ribbon cable 112 to the transducer 100, the splines attached to the top will be inserted into the slotted area of the hull, and glued in place. A restraining lanyard is also provided in some embodiments in case the glue fails. In this embodiment, a cable-pulling wire is supplied which is fed into the hull 50 from the transducer mounting position, and shaken down to an access port, where it can be retrieved. The cable will then be pulled back along the hull to the fin slot, and through the hull. The IDC connector 108 is attached and inserted into the transducer 100 with grease, and the transducer 100 is glued to the hull 50.

Figure 5:
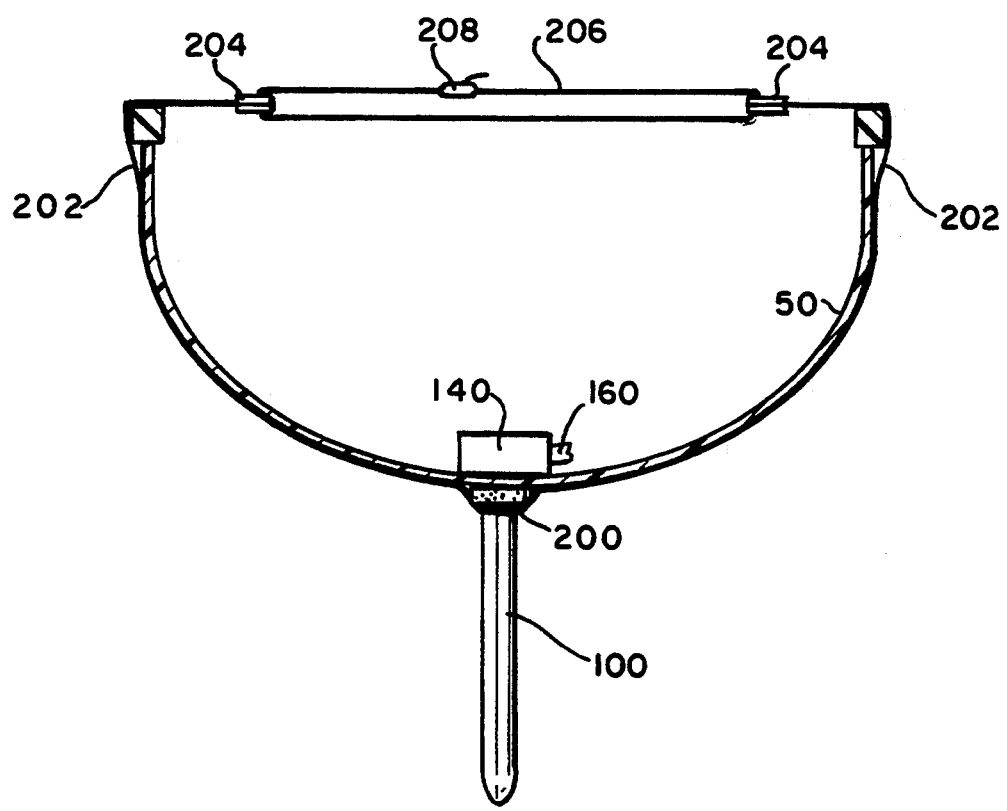
FIG. 5 is a front elevation view of a speed transducer as shown in FIGS. 1–4 and mounted using an alternative hull mounting arrangement.
Figure 5A:
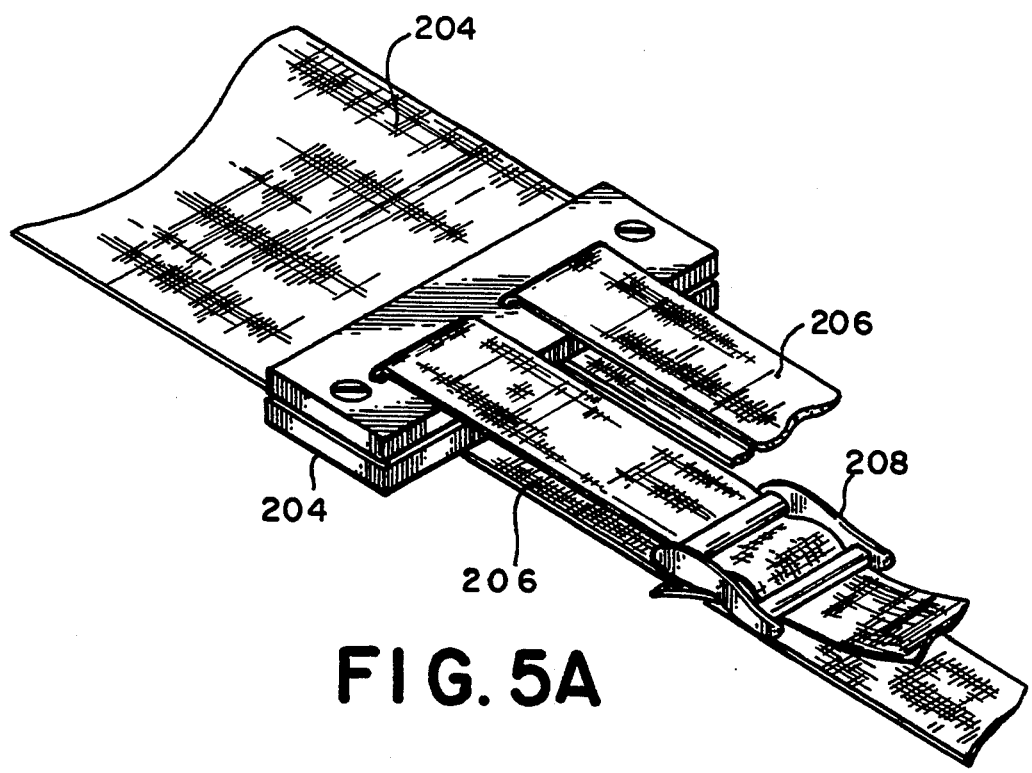
FIG. 5A is a partial perspective view of the mounting hardware used to secure the embodiment shown in FIG. 5.

Certain embodiments of the present invention also permit the transducer 100 to be mounted to the hull without drilling any holes. As shown in FIG. 5, in certain embodiments of the present invention the transducer 100 is attached to a curved plate 200 that conforms to the surface of the hull 50. Placed between the curved plate 200 and the transducer 100 is a strip 202 of coated nylon fabric or thin extruded rubber which is carried up around each side of the hull 50. At each end of the strip 202 a stiffening member 204 is attached, such as a plastic plate. One or more nylon straps 206 are preferably attached to the plastic plate 204 and can be tightened by inserting each of the straps 206 into a buckle 208. As seen in FIG. 5A each of the straps 206 is preferably provided with its own buckle 208. The straps 206 provide a secure but detachable mounting for the transducer 100. The best strap mounting is entirely non-metallic, except for screws to attach the transducer 100 to the plastic backing plate 200. When using this embodiment of the present invention for mounting the transducer 100, the ribbon cable 112 must be long enough to reach to a connection point above the hull 50 is placed between the flexible mounting strip 200 and the hull 50, and connected to the transducer 100 with an insulation displacement connector socket 108 as described above with reference to FIG. 1. The thin layer of cable 202, when covered with a conforming strip, causes minimal disturbance to the flow of water around the hull. The provision of this alternate mounting method is greatly facilitated by the detachable cable connection described above with reference to the embodiment illustrated in FIG. 1, as only one type of fin containing the transducer 100 is needed for both mounting methods. It should be noted, however, that it is necessary to use a shielded ribbon cable with the strap mounting shown in FIG. 5. Without the shield, enough coil drive voltage gets into the water to produce a voltage on the pickup electrodes which is equivalent to a speed of about 0.3 m/sec or less, depending on the depth of the water.

Figure 5B:
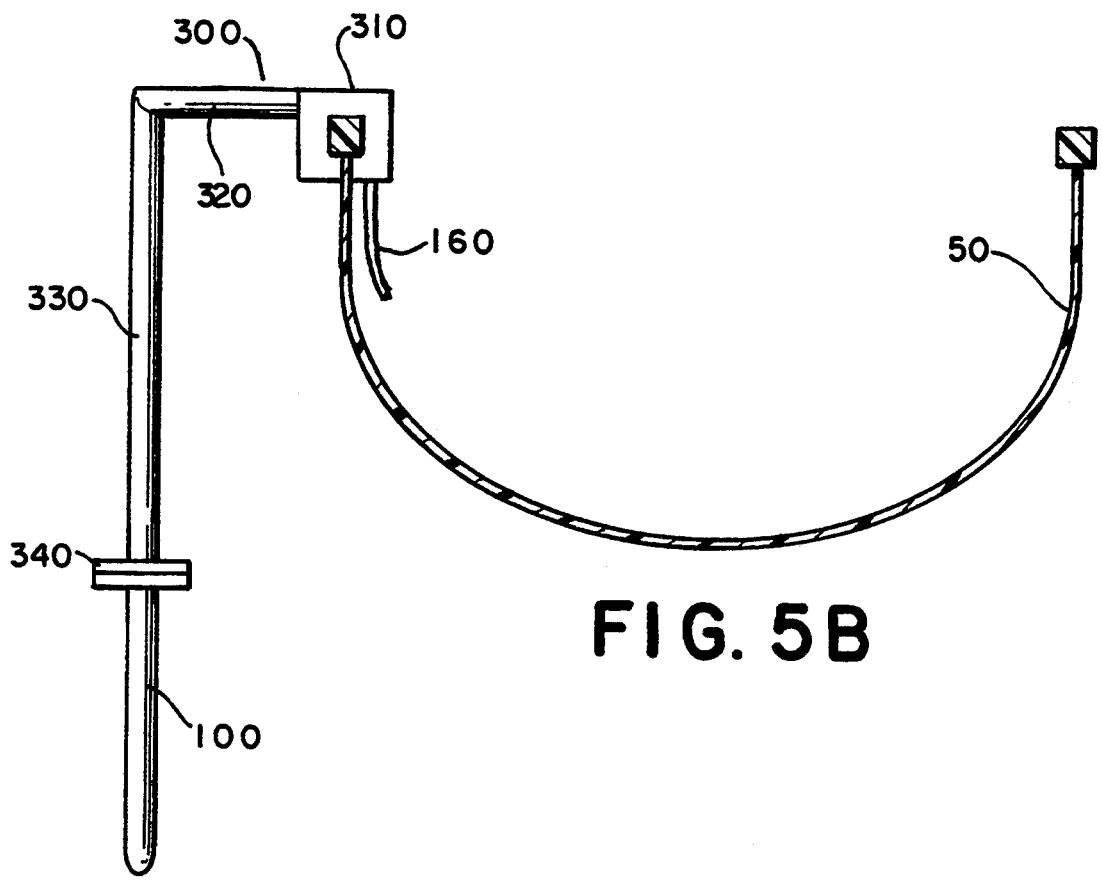
FIG 5B is a front elevation view of another alternative hull mounting arrangement.

Another aspect of the present invention is shown in FIG. 5B, where a thin hydrodynamically shaped boom 330 is provided to mount a transducer 100 as an outrigger below the waterline. Those of ordinary skill will appreciate that the boom 330 should be designed to place the transducer 100 in the water at a point outside the hydrodynamic boundary layer of the hull. The boom 330 is attached to a mounting assembly 310,320 which is bolted to the hull 50 using the same bolts which attach one of the riggers, i.e., the A-frame piece which holds the oarlock of a standard racing hull. The attachment is most preferably a quick disconnect, which will also allow for tilting the boom 310 out of the water, in docking, or during races, when the extra drag may be unacceptable. The boom 330 is useful both for transducers made in accordance with other aspects of the present invention as well as other types of transducers.

In any embodiment, however, the preferred position for the coil 110 is one which places the sensing area of the transducer 100 outside the boundary layer of the hull 50 of the craft on which it is mounted, so that the transducer sensitivity is independent of the exact mounting position, and the user does not have to calibrate the transducer for each installation. In the case of rowing shells, with a maximum speed of about 7 m/sec, the transducer described herein must be mounted within about 4 m of the bow. Details of the boundary layer thickness are well known to those of ordinary skill in the art.

Another important aspect of the present invention is the provision of an electrostatically shielded coil 110. It has been found that a velocity response extending to at least 5 Hz is needed to adequately measure the variation of velocity in rowing shells and similar watercraft, making it impossible to use a simple switched DC voltage in the coil 110, as done in certain of the prior art systems as described above. When a sinusoidal voltage is applied to the coil 110 it is necessary to provide electrostatic shielding to prevent introducing excessive voltage into the coil-mounted electrodes 111. Such shielding is an important aspect of the performance of the present invention.

Figure 2:
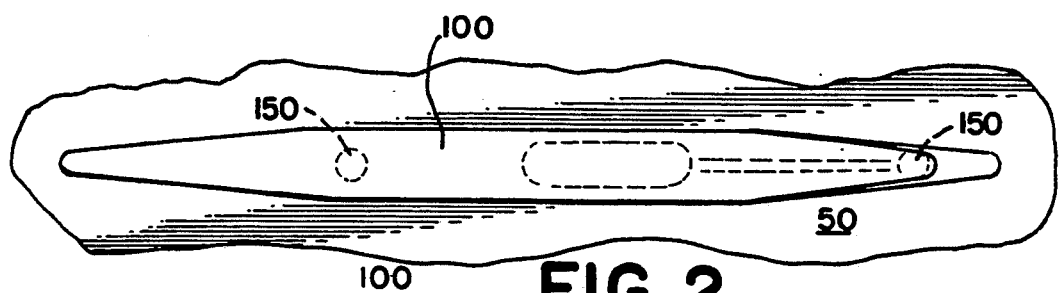
FIG. 2 is a bottom view of the speed transducer of the present invention shown in FIG. 1.
Figure 3:
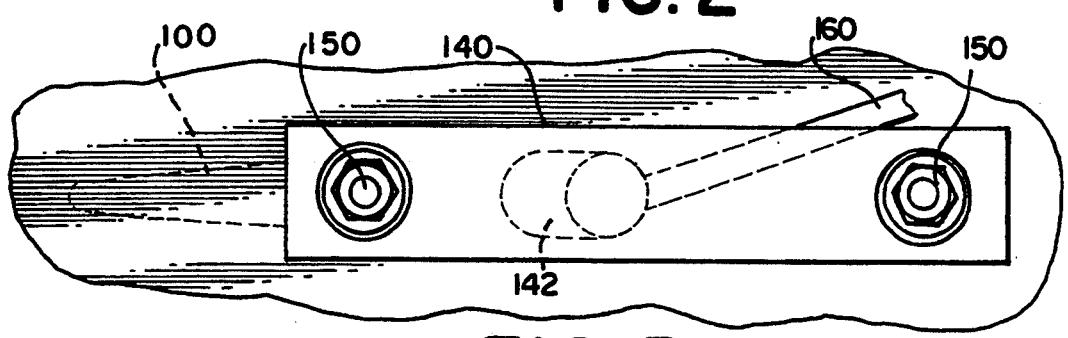
FIG. 3 is a top view of the speed transducer of the present invention shown in FIG. 1.

The transducer 100 of the present invention most preferably uses a shielded AC exciting coil 110 with oval cross section. The optimum coil for insertion into a fin is one in which strips of transformer iron are stacked to make a core approximately $0.075 \times 0.375 \times 2.00$ inches ($1.9 \times 9.5 \times 50.8$ mm), on which copper wire is wound around the $0.075 \times 0.375$ inch ($1.9 \times 9.5$ mm) cross-section to build up an oval coil, which is placed in the transducer 100 so that smallest dimension of the coil 110 is perpendicular to the sides of the structure housing the coil 110 as can be observed with reference to FIGS. 1 and 2. This gives the largest magnetic field in the water outside the transducer 100 and, for a given coil power, and allows for the thinnest possible transducer structure.

A number of additional features of the present invention pertain to the amplifier circuit and will be discussed with reference to FIG. 6. As will be readily understood by those of ordinary skill, several assumptions must be made and understood, and several conditions must exist in order for the present invention to effectively operate. First, there may be as much as 1.0 V of radio frequency voltage between points 10 cm apart in the water found in rivers located around populated areas, due to the presence of radio stations. Second, between the coil-mounted electrodes 111 there may also be about 0.001 V (1.0 mV) or more of 60 Hz voltage, with higher harmonics in the US and other countries with a 60 Hz power grid, or of 50 Hz voltage in various foreign countries. Third, the effective source resistance of the Faraday voltage in the water depends on the concentration of impurities in the water and the electrode dimensions, and may be higher than $10^5$ ohms (100 k$\Omega$) in some cases, although it will generally be less than $10^3$ ohms (1 k$\Omega$).

Figure 6:
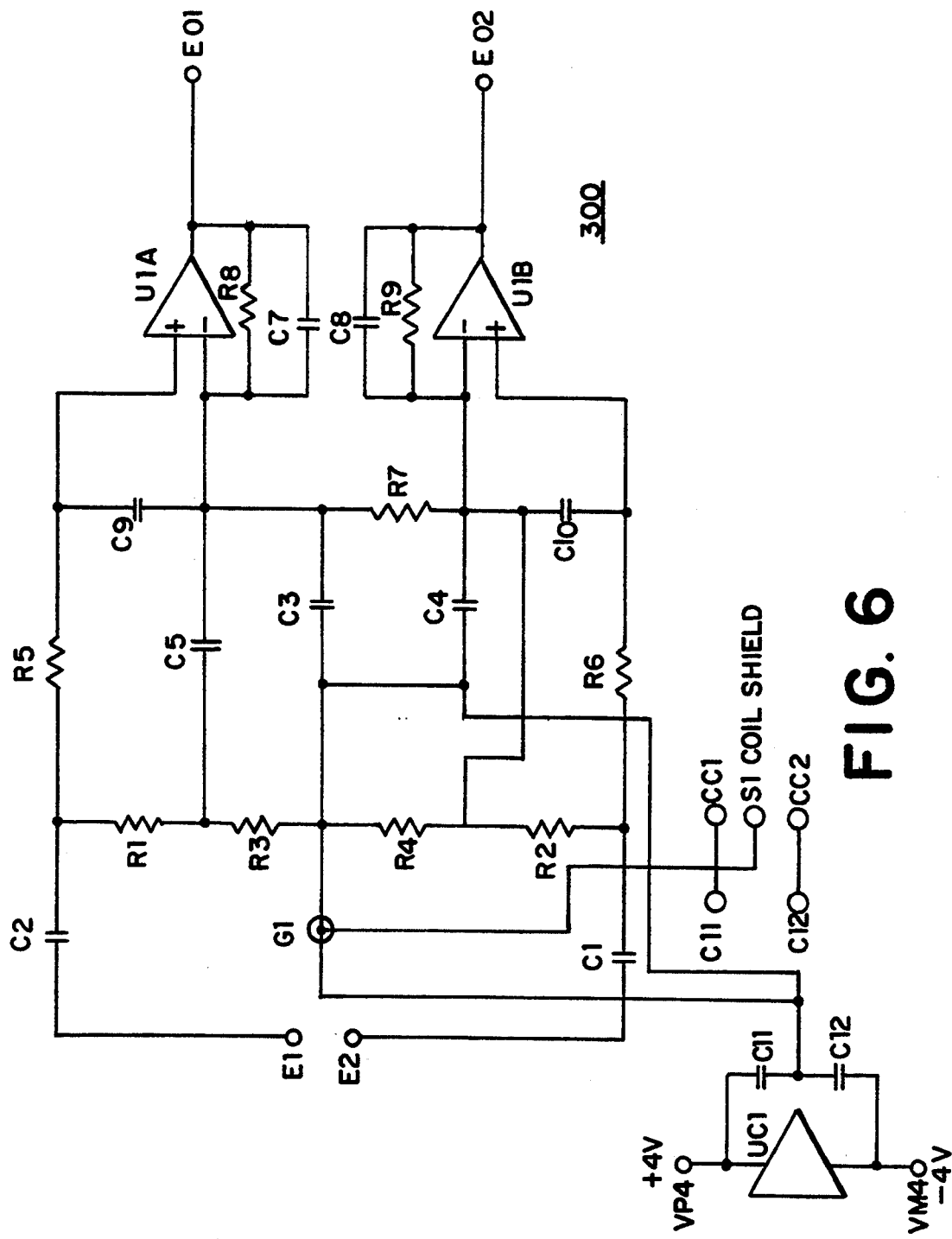
FIG. 6 is a schematic of a preferred amplifier circuit for use with an electromagnetic speed transducer.

Thus, with these considerations in mind, in order to provide differential amplification of the Faraday effect voltage between input electrodes 111 while minimizing the effect of RF voltages and the effect of varying source resistance, the present invention preferably uses the amplifier circuit 300 as shown in FIG. 6. The basic elements of the differential amplifier such as the dual amplifier U1A and U1B, resistors R7, R8, and R9, and rolloff capacitors C7 and C8, are well known. One of the important aspects of the amplifier circuit 400 of the present invention is the impedance boosting circuit of R1, R3 and C5, and the amplifier U1A, which by themselves lower the input resistance to R1+R3. By adding feedback to the junction of R1 and R3 through the additional capacitor C5, the input resistance is increased by several hundred times. An equivalent circuit is also provided by resistors R2 and R4, and capacitor C6. However, the amplifier circuit 400 of the present invention also adds resistor RS, and capacitors C9 and C3, and for the other half of the circuit, resistor R6 and capacitors C10 and C4 to provide effective RF filtering to prevent the amplifier from responding to high amplitude RF in the water, produced by radio stations in the vicinity. Those of ordinary skill will appreciate the advantage of the amplifier circuit 400 shown in FIG. 6. Although it is preferred that the functions be accomplished as shown, it will be realized that different arrangements of components or substitute circuitry could be designed to function in the same manner as the illustrated amplifier circuit 400, thereby achieving the same result, namely, adequate amplification that is free of significant noise.

Excessive RF interference at FM and low TV band frequencies may be caused by RF getting into the measurement box, but there was also a small problem with the transducer amplifier. The lead lengths on the printed circuit board between the amplifier U1 inputs and the various capacitors is therefore reduced to a minimum, and the capacitors C3 and C4 of FIG. 6 are connected to the negative supply lead of the amplifier, rather than directly to the circuit ground.

The embodiment of the present invention described herein also provides a significant advance in manufacturability by having a one-piece circuit board assembly 106 which is cast or transfer molded into a transducer 100 in the form of a fin without requiring a cable. The techniques and advantages of transfer molding a circuit board within a fin structure or other housing are well known and are readily applied by those of ordinary skill to the structure disclosed herein.

Although certain embodiments of the present invention have been set forth herein and described in detail, those of ordinary skill will realize that numerous modifications and adaptations are easily made. Accordingly, reference should be had to the appended claims in order to ascertain the true scope of the present invention.

What is claimed is:

1. A watercraft speed transducer comprising a housing molded in the shape of a fin;
    an alternating current coil driven with a regulated alternating current for producing an alternating current magnetic field, the coil comprising a core disposed within the housing;
    two input electrodes extending from within the housing and through the housing;
    a grounding electrode electrically connected to circuit ground;
    a differential amplifier circuit for amplifying an input voltage, the differential amplifier electronically connected to the coil and providing an output signal to a means for signal processing the differential amplifier comprising at least (i) a circuit for increasing impedance of the amplifier; and (ii) a filtering RF interference,
    whereby the coil produces the input voltage upon motion of the transducer through water having dissolved ions therein and a useful speed indication signal is generated from the input voltage produced by moving the transducer through the water at speeds between about 1.6 ft/sec (0.5 m/sec) and 33 ft/sec (10 m/sec),
    wherein the coil, one-half of a connector and the differential amplifier are disposed on a circuit within the housing, and the one-half connector is for mechanically and electrically connecting an external signal line for transmittinq the output signal outside the housing.

2. The speed transducer of claim 1, wherein the housing further comprises a cavity one-half of a connector is disposed within the cavity.

3. The speed transducer of claim 2, further comprising a waterproof material for filling the cavity.

4. The speed transducer of claim 1, further comprising a means for mounting a restraining cable to the housing, the restraining cable being connected to the watercraft.

5. The speed transducer of claim 1, further comprising an external means for mounting the transducer to the watercraft.

6. The speed transducer of claim 8 further comprising a spline is inserted into a slot in a watercraft comprising slotted hulls for existing fins.

7. The speed transducer of claim 1, further comprising a mounting block disposed inside the watercraft for holding the transducer in place using one or more bolts, wherein a portion of the watercraft is disposed between the mounting block and the transducer.

8. The speed transducer of claim 7, wherein the mounting block comprises a watertight cable access fitting and a cavity.

9. The speed transducer of claim 8, wherein the connector is connected to a cable that extends into the cavity within the mounting block and is joined by a transition connector to a second cable extending through the watertight cable access fitting.

10. The apparatus of claim 1, wherein at least a portion of the housing is constructed to conform to the watercraft and further comprising a thin flexible strap connected to the housing and the watercraft for retaining the transducer.

11. The apparatus of claim 1, further comprising a boom detachably connected to the watercraft, wherein the transducer is mounted to the boom.

* * * * *